United States Patent [19]

Forsberg

[11] Patent Number: 5,047,175
[45] Date of Patent: Sep. 10, 1991

[54] SALT COMPOSITION AND EXPLOSIVES USING SAME

[75] Inventor: John W. Forsberg, Mentor, Ohio

[73] Assignee: The Lubrizol Corporation, Wickliffe, Ohio

[21] Appl. No.: 265,877

[22] Filed: Nov. 1, 1988

Related U.S. Application Data

[62] Division of Ser. No. 137,301, Dec. 23, 1987, Pat. No. 4,828,633.

[51] Int. Cl.$^5$ .................... B01F 17/16; B01F 17/36; C07C 69/40
[52] U.S. Cl. .................... 252/356; 252/309; 252/357; 252/51.5 A; 560/196
[58] Field of Search .................... 252/309, 356, 51.5 A, 252/357; 560/196, 198

[56] References Cited

U.S. PATENT DOCUMENTS

| 2,345,199 | 3/1944 | Hodson | 252/19 |
|---|---|---|---|
| 3,027,324 | 3/1962 | Rosenberg | 252/8.5 |
| 3,047,493 | 7/1962 | Rosenberg | 252/8.5 |
| 3,161,551 | 12/1964 | Egly et al. | 149/46 |
| 3,212,945 | 10/1965 | Berthmann et al. | 149/51 |
| 3,216,936 | 11/1965 | LeSuer | 252/32.7 |
| 3,219,666 | 11/1965 | Norman et al. | 260/263 |
| 3,269,946 | 8/1966 | Wiese | 252/32.5 |
| 3,281,356 | 10/1966 | Coleman | 252/32.7 |
| 3,311,558 | 3/1967 | Prizer et al. | 252/47.5 |
| 3,311,561 | 3/1967 | Anderson et al. | 252/75 |
| 3,364,001 | 1/1968 | Drummond et al. | 44/71 |
| 3,378,494 | 4/1968 | Berger | 252/77 |
| 3,397,097 | 8/1968 | Atalin et al. | 149/46 |
| 3,442,727 | 5/1969 | Thornton | 149/46 |
| 3,447,973 | 6/1969 | Bluhm | 149/2 |
| 3,447,979 | 6/1969 | Bluhm et al. | 149/19 |
| 3,453,155 | 7/1969 | Shuran et al. | 149/5 |
| 3,459,608 | 8/1969 | Ludolsky et al. | 149/56 |
| 3,541,012 | 11/1970 | Staebe | 252/51.5 |
| 3,576,743 | 4/1971 | Widmer et al. | 252/51.5 |
| 3,617,406 | 11/1971 | Young | 149/41 |
| 3,629,119 | 12/1971 | Weaver | 252/77 |
| 3,632,511 | 1/1972 | Liao | 252/51.5 |
| 3,639,242 | 2/1972 | Le Suer | 252/56 R |
| 3,658,707 | 4/1972 | Delafield et al. | 252/51.5 |
| 3,674,578 | 7/1972 | Cattermole et al. | 149/2 |
| 3,687,644 | 8/1972 | Delafield et al. | 44/56 |
| 3,708,522 | 1/1973 | Le Suer | 260/485 G |
| 3,715,247 | 2/1973 | Wade | 149/21 |
| 3,765,964 | 10/1973 | Wade | 149/2 |
| 3,770,522 | 11/1973 | Tomis | 149/2 |
| 3,794,534 | 2/1974 | Chandler | 149/2 |
| 3,836,470 | 9/1974 | Miller | 252/51.5 |
| 3,836,471 | 9/1974 | Miller et al. | 252/51.5 |
| 3,838,052 | 9/1974 | Miller | 252/56 |
| 3,865,813 | 2/1975 | Gergel | 260/239.3 |
| 3,868,330 | 2/1975 | Meinhardt et al. | 252/33.6 |
| 3,948,800 | 4/1976 | Meinhardt | 252/356 |
| 3,957,854 | 3/1976 | Miller | 260/482 |
| 4,008,108 | 2/1977 | Chrisp | 149/2 |
| 4,010,105 | 3/1977 | Holgado | 252/77 |
| 4,048,080 | 9/1977 | Lee et al. | 252/51.54 |
| 4,053,426 | 10/1977 | Davis et al. | 252/34 |
| 4,098,585 | 7/1978 | Vartanian et al. | 44/63 |
| 4,110,134 | 8/1978 | Wade | 149/2 |
| 4,111,727 | 9/1978 | Clay | 149/2 |
| 4,138,281 | 2/1979 | Deney et al. | 149/2 |
| 4,140,640 | 2/1979 | Scherubel et al. | 252/8.55 |
| 4,141,767 | 2/1979 | Sudweeks | 149/2 |
| 4,149,916 | 4/1979 | Wade | 149/56 |
| 4,149,917 | 4/1979 | Wade | 149/56 |
| 4,181,546 | 1/1980 | Clay | 149/21 |
| 4,185,485 | 1/1980 | Schick et al. | 72/42 |
| 4,216,040 | 8/1980 | Sudweeks | 149/21 |

(List continued on next page.)

Primary Examiner—Richard D. Lovering
Assistant Examiner—Daniel S. Metzmaier
Attorney, Agent, or Firm—Robert A. Franks; Frederick D. Hunter; Forrest L. Collins

[57] ABSTRACT

Salt compositions are disclosed which comprise: (A) at least one salt moiety derived from (A)(I) at least one high-molecular weight polycarboxylic acylating agent, said acylating agent (A)(I) having at least one hydrocarbyl substituent having an average of from about 20 to about 500 carbon atoms, and (A)(I) ammonia, at least one amine, at least oen alkali or alkaline earth metal, and/or at least oen alkali or alkaline earth metal compound; (B) at least one salt moiety derived from (B)(I) at least oen low-molecular weight polycarboxylic acylating agent, said acylating agent (B)(I) optionally having at least one hydrocarbyl substituent having an average of up to about 18 carbona toms, and (B)(II) ammonia, at least one amine, at least one alkali or alkaline earth metal, and/or at least one alkali or alkaline earth metal compound; said components (A) and (B) being coupled together by (C) at least one compound having (i() two or more primary amino groups, (ii) two or more secondary amino groups, (iii) at least one primary amino group and at least one secondary amino group, (iv) at least two hydroxyl groups or (v) at least one primary or secondary amino group and at least one hydroxyl group. These salt compositions are useful as emulsifiers in water-in-oil explosive emulsions, particularly cap-sensitive explosive emulsions.

59 Claims, No Drawings

U.S. PATENT DOCUMENTS

| | | | |
|---|---|---|---|
| 4,218,272 | 8/1980 | Brockington | 149/21 |
| 4,225,447 | 9/1980 | Law et al. | 252/34.7 |
| 4,230,588 | 10/1980 | Bonazza et al. | 252/51.5 |
| 4,231,821 | 11/1980 | Sudweeks et al. | 149/21 |
| 4,233,165 | 11/1980 | Salathiel | 252/8.55 |
| 4,234,435 | 11/1980 | Meinhardt et al. | 252/51.5 |
| 4,248,644 | 2/1981 | Healy | 149/21 |
| 4,253,974 | 3/1981 | Valdho et al. | 252/8.55 |
| 4,253,975 | 3/1981 | Law et al. | 252/32.7 |
| 4,287,010 | 9/1981 | Owen | 149/2 |
| 4,294,633 | 10/1981 | Clay | 149/2 |
| 4,310,364 | 1/1982 | Ekman et al. | 149/2 |
| 4,315,784 | 2/1982 | Hattori et al. | 149/2 |
| 4,315,787 | 2/1982 | Hattori et al. | 149/2 |
| 4,326,900 | 4/1982 | Hattori et al. | 149/2 |
| 4,329,249 | 5/1982 | Torsberg | 252/34.7 |
| 4,343,663 | 8/1982 | Briza | 149/4 |
| 4,357,134 | 11/1982 | Binet et al. | 149/2 |
| 4,368,133 | 1/1983 | Torsberg | 252/75 |
| 4,383,873 | 5/1983 | Wade et al. | 149/2 |
| 4,391,659 | 7/1983 | Smith | 149/2 |
| 4,394,198 | 7/1983 | Takeuchi et al. | 149/21 |
| 4,404,050 | 9/1983 | Yorke et al. | 149/2 |
| 4,435,297 | 3/1984 | Torsberg | 252/34.7 |
| 4,443,703 | 5/1984 | Torsberg | 252/75 |
| 4,447,348 | 5/1984 | Torsberg | 252/75 |
| 4,448,619 | 5/1984 | MItchell | 149/21 |
| 4,472,215 | 9/1984 | Binet et al. | 149/109.6 |
| 4,490,194 | 12/1984 | Cooper et al. | 149/2 |
| 4,490,195 | 12/1984 | Cooper et al. | 149/2 |
| 4,496,405 | 1/1985 | Cechinski | 149/2 |
| 4,504,276 | 3/1985 | Baker | 44/51 |
| 4,525,225 | 6/1985 | Cechanski | 149/19.5 |
| 4,548,659 | 11/1985 | Jessop | 149/18 |
| 4,552,597 | 11/1985 | Abegg | 149/2 |
| 4,554,032 | 11/1985 | Hattori et al. | 149/21 |
| 4,555,278 | 11/1985 | Cescon et al. | 149/21 |
| 4,615,751 | 10/1986 | Smith et al. | 149/2 |
| 4,708,753 | 11/1987 | Forsberg | 149/2 |
| 4,849,131 | 7/1989 | Sweeney | 252/356 X |
| 4,863,534 | 9/1989 | Forsberg | 252/309 |

FOREIGN PATENT DOCUMENTS

| | | |
|---|---|---|
| 0155800 | 9/1955 | European Pat. Off. |
| 0004426 | 10/1979 | European Pat. Off. |
| 0156572 | 10/1985 | European Pat. Off. |
| 984409 | 2/1965 | United Kingdom |
| 1009197 | 11/1965 | United Kingdom |
| 1020293 | 2/1966 | United Kingdom |
| 1031130 | 5/1966 | United Kingdom |
| 1098936 | 1/1968 | United Kingdom |
| 1162436 | 3/1968 | United Kingdom |
| 1206059 | 9/1970 | United Kingdom |
| 1214245 | 12/1970 | United Kingdom |
| 1306546 | 2/1973 | United Kingdom |
| 1335097 | 10/1973 | United Kingdom |
| 1423876 | 2/1976 | United Kingdom |
| 153092 | 1/1979 | United Kingdom |
| 1532836 | 11/1979 | United Kingdom |
| 1557917 | 12/1979 | United Kingdom |
| 2042495 | 9/1980 | United Kingdom |
| 2058740 | 4/1981 | United Kingdom |

SALT COMPOSITION AND EXPLOSIVES USING SAME

This is a division of application Ser. No. 137,301, filed Dec. 23, 1987 now U.S. Pat. No. 4,828,633.

TECHNICAL FIELD

This invention relates to novel salt compositions and to explosive compositions comprising said salt compositions. The salt compositions are useful as emulsifiers in the explosive compositions. The explosive compositions are water-in-oil explosive emulsions which, in one embodiment, are cap-sensitive explosive emulsions.

BACKGROUND OF THE INVENTION

Hydrocarbyl-substituted carboxylic acylating agents having at least about 30 aliphatic carbon atoms in the substituent are known. Examples of such acylating agents include the polyisobutenyl-substituted succinic acids and anhydrides. The use of such carboxylic acylating agents as additives in normally liquid fuels and lubricants is disclosed in U.S. Pat. Nos. 3,288,714 and 3,346,354. These acylating agents are also useful as intermediates for preparing additives for use in normally liquid fuels and lubricants as described in U.S. Pat. Nos. 2,892,786; 3,087,936; 3,163,603; 3,172,892; 3,189,544; 3,215,707; 3,219,666; 3,231,587; 3,235,503; 3,272,746; 3,306,907; 3,306,908; 3,331,776; 3,341,542; 3,346,354; 3,374,174; 3,379,515; 3,381,022; 3,413,104; 3,450,715; 3,454,607; 3,455,728; 3,476,686; 3,513,095; 3,523,768; 3,630,904; 3,632,511; 3,697,428; 3,755,169; 3,804,763; 3,836,470; 3,862,981; 3,936,480; 3,948,909; 3,950,341; 4,234,435; and 4,471,091; and French Patent 2,223,415.

U.S. Pat. No. 3,216,936 describes nitrogen-containing dispersants for use in lubricants which are obtained by the reaction of an alkylene amine with an acidic mixture consisting of a hydrocarbon-substituted succinic acid having at least about 50 aliphatic carbon atoms in the hydrocarbon substituent and an aliphatic monocarboxylic acid. The aliphatic monocarboxylic acids are described as including saturated and unsaturated acids such as acetic acid, dodecanoic acid, oleic acid, naphthenic acid, formic acid, etc. Acids having 12 or more aliphatic carbon atoms, particularly stearic acid and oleic acid, are described as being especially useful.

U.S. Pat. Nos. 3,639,242 and 3,708,522 describe compositions prepared by post-treating mono- and polycarboxylic acid esters with mono- or polycarboxylic acid acylating agents. The compositions thus obtained are reported to be useful as dispersants in lubricants and fuels.

U.S. Pat. No. 4,642,330 discloses dispersant salt compositions made by reacting phosphorus-free carboxylic solubilizers with sulfonic acid-free organic acids or mineral acids. The carboxylic solubilizer is the reaction product of a polycarboxylic acid acylating agent having at least one hydrocarbon-based substituent of at least 8 to 500 carbon atoms with at least one poly(alkyleneamine). The reference indicates that these dispersant salt compositions have good thermal stability when mixed with a surfactant or a hydrophilic organic solvent, and that they can be used with aqueous solutions to disperse various fillers including carbon black and to solubilize various fluids.

Nitrogen-containing, phosphorus-free carboxylic solubilizers useful in water based functional fluids are disclosed in U.S. Pat. Nos. 4,329,249; 4,368,133; 4,435,297; 4,447,348; and 4,448,703. These solubilizers are made by reacting (I) at least one carboxylic acid acylating agent having at least one hydrocarbyl substituent of from about 12 to about 500 carbon atoms with (II) at least one (a) N-(hydroxyl-substituted hydrocarbyl) amine, (b) hydroxyl-substituted poly(hydrocarbyloxy) analog of said amine (a), or (c) mixtures of (a) and (b). These patents indicate that preferred acylating agents include the substituted succinic acids or anhydrides, such as polyisobutenyl-substituted succinic anhydride, and that the amines that are useful include the primary, secondary and tertiary alkanol amines, such as diethylethanolamine and mixtures of diethylethanolamine and ethanolamine. These solubilizers are useful in dispersing oil-soluble, water-insoluble functional additives in water-based functional fluids.

Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, inter alia, in U.S. Pat. Nos. 3,447,978; 3,765,964; 3,985,593; 4,008,110; 4,097,316; 4,104,092; 4,218,272; 4,259,977; 4,357,184; 4,371,408; 4,391,659; 4,404,050; 4,409,044; 4,448,619; 4,453,989; and 4,534,809; U.K. Patent Application GB 2,050,340A; and European Application Publication No. 0,156,572.

European Application 0,155,800 discloses an explosive emulsion composition comprising a discontinuous phase containing an oxygen-supplying component and an organic medium forming a continuous phase wherein the oxygen-supplying component and organic medium are capable of forming an emulsion which, in the absence of a supplementary adjuvant, exhibits an electrical conductivity measured at 60° C., not exceeding 60,000 picomhos/meter. The reference indicates that the conductivity may be achieved by the inclusion of a modifier which also functions as an emulsifier. The modifier is comprised of a hydrophilic moiety and a lipophilic moiety. The lipophilic moiety can be derived from a poly[alk(en)yl] succinic anhydride. Poly(isobutylene) succinic anhydride having a number average molecular weight in the range of 400 to 5000 is specifically identified as being useful. The hydrophilic moiety is described as being polar in character, having a molecular weight not exceeding 450 and can be derived from polyols, amines, amides, alkanol amines and heterocyclics. Example 14 of this reference discloses the use of a 1:1 condensate polyisobutenyl succinic anhydride (number average molecular weight=1200) and N, N-dimethylamino ethanol as the modifier.

Cap-sensitive explosive emulsions are water-in-oil explosive emulsions which can be detonated without the use of a booster. Examples of such cap-sensitive explosive emulsions are disclosed, inter alia, in U.S. Pat. Nos. 3,715,247; 4,110,134; 4,149,916; 4,149,917; 4,231,821; 3,383,873; 4,394,198; and 4,490,195.

SUMMARY OF THE INVENTION

The present invention provides for a novel salt composition comprising: (A) at least one salt moiety derived from (A)(I) at least one high-molecular weight polycarboxylic acylating agent, said acylating agent (A)(I) having at least one hydrocarbyl substituent having an average of from about 20 to about 500 carbon atoms, and (A)(II) ammonia, at least one amine, at least one alkali or alkaline earth metal, and/or at least one alkali or alkaline earth metal compound; (B) at least one salt moiety derived from (B)(I) at least one low-molecular weight polycarboxylic acylating agent, said acylating agent (B)(I) optionally having at least one hydrocarbyl substituent having an average of up to about 18 carbon atoms, and (B)(II) ammonia, at least one amine, at least one alkali or alkaline earth metal, and/or at least one alkali or alkaline earth metal compound; said components (A) and (B) being coupled together by (C) at least one compound having (i) two or more primary amino groups, (ii) two or more secondary amino groups, (iii) at least one primary amino group and at least one secondary amino group, (iv) at least two hydroxyl groups or (v) at least one primary or secondary amino group and at least one hydroxyl group. These salt compositions are useful as emulsifiers in water-in-oil explosive emulsions, particularly cap-sensitive water-in-oil explosive emulsions.

DESCRIPTION OF THE PREFERRED EMBODIMENTS

The term "emulsion" as used in this specification and in the appended claims is intended to cover not only water-in-oil emulsions, but also compositions derived from such emulsions wherein at temperatures below that at which the emulsion is formed the discontinuous phase is solid or in the form of droplets of super-cooled liquid. This term also covers compositions derived from or formulated as such water-in-oil emulsions that are in the form of gelatinous or semi-gelatinous compositions.

The term "hydrocarbyl" is used herein to include:

(1) hydrocarbyl groups, that is, aliphatic (e.g., alkyl or alkenyl), alicyclic (e.g., cycloalkyl, cycloalkenyl), aromatic, aliphatic- and alicyclicsubstituted aromatic groups and the like as well as cyclic groups wherein the ring is completed through another portion of the molecule (that is, any two indicated groups may together form an alicyclic group);

(2) substituted hydrocarbyl groups, that is, those groups containing non-hydrocarbon groups which, in the context of this invention, do not alter the predominantly hydrocarbyl nature of the hydrocarbyl group; those skilled in the art will be aware of such groups, examples of which include ether, oxo, halo (e.g., chloro and fluoro), alkoxyl, mercapto, alkylmercapto, nitro, nitroso, sulfoxy, etc.;

(3) hetero groups, that is, groups which, while having predominantly hydrocarbyl character within the context of this invention, contain other than carbon in a ring or chain otherwise composed of carbon atoms. Suitable heteroatoms will be apparent to those of skill in the art and include, for example, sulfur, oxygen, nitrogen and such substituents as pyridyl, furanyl, thiophenyl, imidazolyl, etc.

In general, no more than about three nonhydrocarbon groups or heteroatoms and preferably no more than one, will be present for each ten carbon atoms in a hydrocarbyl group. Typically, there will be no such groups or heteroatoms in a hydrocarbyl group and it will, therefore, be purely hydrocarbyl.

The hydrocarbyl groups are preferably free from acetylenic unsaturation; ethylenic unsaturation, when present will generally be such that there is no more than one ethylenic linkage present for every ten carbon to-carbon bonds. The hydrocarbyl groups are often completely saturated and therefore contain no ethylenic unsaturation.

The term "lower" as used herein in conjunction with terms such as alkyl, alkenyl, alkoxy, and the like, is intended to describe such groups which contain a total of up to 7 carbon atoms.

Components (A)(I) and (B)(I)

The carboxylic acylating agents (A)(I) and (B)(I) are aliphatic or aromatic, polycarboxylic acids or acid-producing compounds. Throughout this specification and in the appended claims, the term "carboxylic acylating agent" is intended to include carboxylic acids as well as acid-producing derivatives thereof such as anhydrides, esters, acyl halides and mixtures thereof, unless otherwise specifically stated.

The acylating agents (A)(I) and (B)(I) may contain polar substituents provided that the polar substituents are not present in portions sufficiently large to alter significantly the hydrocarbon character of the acylating agent. Typical suitable polar substituents include halo, such as chloro and bromo, oxo, oxy, formyl, sulfenyl, sulfinyl, thio, nitro, etc. Such polar substituents, if present, preferably do not exceed about 10% by weight of the total weight of the hydrocarbon portion of the acylating agent, exclusive of the carboxyl groups.

Examples of low molecular weight polycarboxylic acids (B)(I) include dicarboxylic acids and derivatives such as maleic acid, maleic anhydride, chloromaleic anhydride, malonic acid, succinic acid, succinic anhydride, glutaric acid, glutaric anhydride, adipic acid, pimelic acid, azelaic acid, sebacic acid. glutaconic acid, citraconic acid, itaconic acid, allyl succinic acid, cetyl malonic acid, tetrapropylene-substituted succinic anhydride, etc. Lower alkyl esters of these acids can also be used.

Low molecular weight hydrocarbyl-substituted succinic acid and anhydrides can also be used. These succinic acids and anhydrides can be represented by the formulae

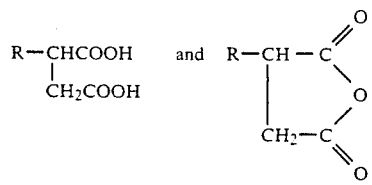

wherein R is a $C_1$ to about a $C_{18}$ hydrocarbyl group. Preferably, R is an aliphatic or alicyclic hydrocarbyl group with less than about 10% of its carbon-to-carbon bonds being unsaturated. R can be derived from olefins of from 2 to about 18 carbon atoms with alpha-olefins being particularly useful. Examples of such olefins include ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha-olefins, $C_{12-16}$ alpha-olefins, $C_{14-16}$ alpha-olefins, $C_{14-18}$ alpha-olefins, $C_{16-18}$ alphaolefins, etc., are particularly useful; these commercial alpha-olefin fractions also usually include minor amounts of alpha-olefins outside the given ranges. The production of such substituted succinic acids and their derivatives is well known to those of skill in the art and need not be discussed in detail herein.

Acid halides of the afore-described low-molecular weight polycarboxylic acids can be used as the low-molecular weight acylating agents (B)(I) of this invention. These can be prepared by the reaction of such acids or their anhydrides with halogenating agents such as phosphorus tribromide, phosphorus pentachloride, phosphorus oxychloride or thionyl chloride. Esters of such acids can be prepared simply by the reaction of the acid, acid halide or anhydride with an alcohol or phenolic compound. Particularly useful are the lower alkyl and alkenyl alcohols such as methanol, ethanol, allyl alcohol, propanol, cyclohexanol, etc. Esterification reactions are usually promoted by the use of alkaline catalysts such as sodium hydroxide or alkoxide, or an acidic catalyst such as sulfuric acid or toluene sulfonic acid.

Although it is preferred that the acylating agent (B)(I) is an aliphatic polycarboxylic acid, and more preferably a dicarboxylic acid, the carboxylic acylating agent (B)(I) may also be an aromatic polycarboxylic acid or acid-producing compound. The aromatic acids are preferably dicarboxy-substituted benzene, naphthalene, anthracene, phenanthrene or like aromatic hydrocarbons., They include also the alkyl-substituted derivatives, and the alkyl groups may contain up to about 12 carbon atoms. The aromatic acid may also contain other substituents such as halo, hydroxy, lower alkoxy, etc. Specific examples of aromatic polycarboxylic acids and acid-producing compounds useful as acylating agent (B)(I) include phthalic acid, isophthalic acid, terephthalic acid, 4-methyl-benzene-1,3-dicarboxylic acid, naphthalene-1,4-dicarboxylic acid, anthracene dicarboxylic acid, 3-dodecyl-benzene-1,4-dicarboxylic acid, 2,5-dibutylbenzene-1,4-dicarboxylic acid, etc. The anhydrides of these dicarboxylic acids also are useful as the carboxylic acylating agent (B)(I).

The high-molecular weight polycarboxylic acylating agents (A)(I) are well known in the art and have been described in detail, for example, in the following U.S., British and Canadian patents: U.S. Pat. Nos. 3,024,237; 3,087,936; 3,163,603; 3,172,892; 3,215,707; 3,219,666; 3,231,587; 3,245,910; 3,254,025; 3,271,310; 3,272,743; 3,272,746; 3,278,550; 3,288,714; 3,306,907; 3,307,928; 3,312,619; 3,341,542; 3,346,354; 3,367,943; 3,373,111; 3,374,174; 3,381,022; 3,394,179; 3,454,607; 3,346,354; 3,470,098; 3,630,902; 3,652,616; 3,755,169; 3,868,330; 3,912,764; 4,234,435; and 4,368,133; British Patents 944,136; 1,085,903; 1,162,436; and 1,440,219; and Canadian Patent 956,397. These patents are incorporated herein by reference.

As disclosed in the foregoing patents, there are several processes for preparing these high-molecular weight acylating agents (A)(I). Generally, these processes involve the reaction of (l) an ethylenically unsaturated carboxylic acid, acid halide, anhydride or ester reactant with (2) an ethylenically unsaturated hydrocarbon containing at least about 20 aliphatic carbon atoms or a chlorinated hydrocarbon containing at least about 20 aliphatic carbon atoms at a temperature within the range of about 100°-300° C. The chlorinated hydrocarbon or ethylenically unsaturated hydrocarbon reactant preferably contains at least about 30 carbon atoms, more preferably at least about 40 carbon atoms, more preferably at least about 50 carbon atoms, and may contain polar substituents, oil-solubilizing pendant groups, and be unsaturated within the general limitations explained hereinabove.

When preparing the carboxylic acid acylating agent, the carboxylic acid reactant usually corresponds to the formula $R_o-(COOH)_n$, where $R_o$ is characterized by the presence of at least one ethylenically unsaturated carbon-to-carbon covalent bond and n is an integer from 2 to about 6 and preferably is 2. The acidic reactant can also be the corresponding carboxylic acid halide, anhydride, ester, or other equivalent acylating agent and mixtures of two or more of these. Ordinarily, the total number of carbon atoms in the acidic reactant will not exceed about 20, preferably this number will not exceed about 10 and generally will not exceed about 6, exclusive of the carboxyl-based groups. Preferably the acidic reactant will have at least one ethylenic linkage in an alpha, beta-position with respect to at least one carboxyl function. Exemplary acidic reactants are maleic acid, maleic anhydride, fumaric acid, itaconic acid, itaconic anhydride, citraconic acid, citraconic anhydride, mesaconic acid, chloromaleic acid, aconitic acid, and the like. Preferred acid reactants include maleic acid and maleic anhydride.

The ethylenically unsaturated hydrocarbon reactant and the chlorinated hydrocarbon reactant used in the preparation of these high-molecular weight carboxylic acylating agents (A)(I) are preferably high molecular weight, substantially saturated petroleum fractions and substantially saturated olefin polymers and the corresponding chlorinated products. Polymers and chlorinated polymers derived from mono-olefins having from 2 to about 30 carbon atoms are preferred. Especially useful polymers are the polymers of 1-mono-olefins such as ethylene, propene, 1-butene, isobutene, 1-hexene, 1-octene, 2-methyl- 1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl1-butene with 1-octene, 3,3-dimethyl-1-pentene with 1-hexene, isobutene with styrene and piperylene, etc.

For reasons of hydrocarbon solubility, the interpolymers contemplated for use in preparing the acylating agents of this invention are preferably substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

In one embodiment of the invention, the polymers and chlorinated polymers are obtained by the polymerization of a $C_4$ refinery stream having a butene content of about 35% to about 75% by weight and an isobutene content of about 30% to about 60% by weight in the presence of a Lewis acid catalyst such as aluminum chloride or boron trifluoride. These polyisobutenes preferably contain predominantly (that is, greater than about 80% of the total repeat units) isobutene repeat units of the configuration.

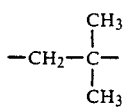

The chlorinated hydrocarbons and ethylenically unsaturated hydrocarbons used in the preparation of the higher molecular weight carboxylic acylating agents preferably have up to about 500 carbon atoms per molecule. Preferred acylating agents (A)(I) are those containing hydrocarbyl groups of from about 20 to about 500 carbon atoms, more preferably from about 30 to about 500 carbon atoms, more preferably from about 40 to about 500 carbon atoms, more preferably from about 50 to about 500 carbon atoms.

The high-molecular weight polycarboxylic acylating agents (A)(I) may also be prepared by halogenating a high molecular weight hydrocarbon such as the abovedescribed olefin polymers to produce a polyhalogenated product, converting the polyhalogenated product to a polynitrile, and then hydrolyzing the polynitrile. They may be prepared by oxidation of a high molecular weight polyhydric alcohol with potassium permanganate, nitric acid, or a similar oxidizing agent. Another method involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

The polycarboxylic acid acylating agents (A)(I) can also be obtained by reacting chlorinated polycarboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in U.S. Pat. No. 3,340,281, this patent being incorporated herein by reference.

The high-molecular weight polycarboxylic acid anhydrides (A)(I) can be obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid groups separated by no more than three carbon atoms such as substituted succinic or glutaric acid, whereas linear anhydrides are usually obtained from polycarboxylic acids having the acid groups separated by four or more carbon atoms.

The acid halides of the polycarboxylic acids can be prepared by the reaction of the acids or their anhydrides with a halogenating agent such as phosphorus tribromide, phosphorus pentachloride, or thionyl chloride.

Hydrocarbyl-substituted succinic acids and the anhydride, acid halide and ester derivatives thereof are particularly preferred acylating agents (A)(I). These acylating agents are preferably prepared by reacting maleic anhydride with a high molecular weight olefin or a chlorinated hydrocarbon such as a chlorinated polyolefin. The reaction involves merely heating the two reactants at a temperature in the range of about 100° C. to about 300° C., preferably, about 100° C. to about 200° C. The product from this reaction is a hydrocarbyl-substituted succinic anhydride wherein the substituent is derived from the olefin or chlorinated hydrocarbon.

The product may be hydrogenated to remove all or a portion of any ethylenically unsaturated covalent linkages by standard hydrogenation procedures, if desired. The hydrocarbyl-substituted succinic anhydrides may be hydrolyzed by treatment with water or steam to the corresponding acid and either the anhydride or the acid may be converted to the corresponding acid halide or ester by reacting with a phosphorus halide, phenol or alcohol. The hydrocarbyl-substituted succinic acids and anhydrides (A)(I) can be represented by the formulae

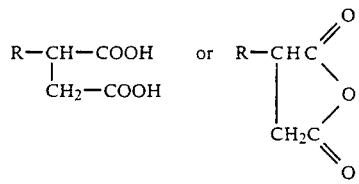

wherein R is the hydrocarbyl substituent. Preferably R contains from about 20 to about 500 carbon atoms, more preferably from about 30 to about 500 carbon atoms, more preferably from about 40 to about 500 carbon atoms, more preferably from about 50 to about 500 carbon atoms.

Although it is preferred that the acylating agent (A)(I) is an aliphatic polycarboxylic acid, and more preferably a dicarboxylic acid, the carboxylic acylating agent (A)(I) may also be an aromatic polycarboxylic acid or acid-producing compound. The aromatic acids are preferably alkyl-substituted, dicarboxysubstituted benzene, naphthalene, anthracene, phenanthrene or like aromatic hydrocarbons. The alkyl groups may contain up to about 30 carbon atoms. The aromatic acid may also contain other substituents such as halo, hydroxy, lower alkoxy, etc.

Component (C)

Component (C) can be any compound having (i) two or more primary amino groups, (ii) two or more secondary amino groups, (iii) at least one primary amino group and at least one secondary amino group, (iv) at least two hydroxyl groups, or (v) at least one primary or secondary amino group and at least one hydroxyl group. These include polyamines, polyols and hydroxyamines.

(1) Polyamines Useful as Component (C)

The polyamines useful as component (C) are characterized by the presence within their structure of at least two —$NH_2$ groups, at least two >NH groups, or at least one —$NH_2$ group and at least one >NH group.

These polyamines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic-substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These amines may be saturated or unsaturated. If unsaturated, the amine is preferably free from acetylenic unsaturation. These amines may also contain non-hydrocarbon substituents or groups as long as these groups do not significantly interfere with the reaction of such amines with reactants (A)(I) and (B)(I). Such nonhydrocarbon substituents or groups include lower alkoxy, lower alkyl, mercapto, nitro, and interrupting groups such as —O— and —S— (e.g., as in such groups as

—CH₂CH₂—X—CH₂CH₂ where X is —O— or —S—).

The polyamines include aliphatic, cycloaliphatic and aromatic polyamines analogous to the aliphatic, cycloaliphatic and aromatic monoamines described below except for the presence within their structure of at least one additional >NH or —NH₂ group.

Aliphatic monoamines include mono-aliphatic and di-aliphatic-substituted amines wherein the aliphatic groups can be saturated or unsaturated and straight or branched chain. Thus, they are primary or secondary aliphatic amines. Such amines include, for example, mono- and di-alkyl-substituted amines, mono- and dialkenyl-substituted amines, and amines having one N-alkenyl substituent and one N-alkyl substituent, and the like. The total number of carbon atoms in these aliphatic monoamines preferably does not exceed about 40 and usually does not exceed about 20 carbon atoms. Specific examples of such monoamines include ethylamine, di-ethylamine, n-butylamine, di-n-butylamine, allylamine, isobutylamine, cocoamine, stearylamine, laurylamine, methyllaurylamine, oleylamine, N-methyloctylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenylethylamine, and 3-(furylpropyl) amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamines, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines and pyranyl-substituted cyclohexylamine.

Aromatic monoamines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(paramethylphenyl) amine, naphthylamine, N-(n-butyl) aniline, and the like. Examples of aliphatic-substituted, cycloaliphatic-substituted, and heterocyclic-substituted aromatic monoamines include para-ethoxyaniline, paradodecylamine, cyclohexyl-substituted naphthylamine and thienylsubstituted aniline.

Heterocyclic polyamines can also be used. As used herein, the terminology "heterocyclic polyamine" is intended to describe those heterocyclic amines containing at least two primary amino groups, at least two secondary amino groups, or at least one of each, and at least one nitrogen as a heteroatom in the heterocyclic ring. As long as there is present in the heterocyclic polyamines at least two primary amino groups, at least two secondary amino groups, or at least one of each, the hetero-N atom in the ring can be a tertiary amino nitrogen; that is, one that does not have hydrogen attached directly to the ring nitrogen. The hetero-N atom can be one of the secondary amino groups; that is, it can be a ring nitrogen with hydrogen directly attached to it. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The 5- and 6-membered heterocyclic rings are preferred.

Among the suitable heterocyclic polyamines are the aziridines, azetidines, azolidines, tetra- and di-hydro pyridines, pyrroles, indoles, piperadines, imidazoles, di- and tetra-hydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro-derivatives of each of the above and mixtures of two or more of these heterocyclic amines. Useful heterocyclic polyamines are the saturated 5- and 6-membered heterocyclic polyamines containing only nitrogen, oxygen and/or sulfur in the hetero ring, especially the piperidines, piperazines, thiomorpholines, morpholines, pyrrolidines, and the like. Usually the aminoalkyl substituents are substituted on a nitrogen atom forming part of the hetero ring. Specific examples of such heterocyclic amines include N-aminoethylpiperazine and N,N'-diaminoethylpiperazine.

Hydrazine and substituted-hydrazines can also be used. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy-substituted phenyl or lower alkyl-substituted phenyl. Specific examples of substituted hydrazines are methylhydrazine, N,N-dimethylhydrazine, N,N'-dimethylhydrazine, phenylhydrazine, N-phenyl-N'-ethylhydrazine, N-(para-tolyl)-N'-(n-butyl)-hydrazine, N-(para-nitrophenyl)-hydrazine, N-(para-nitrophenyl)-N-methylhydrazine, N,N'-di-(para-chlorophenol)-hydrazine, N-phenyl-N'-cyclohexylhydrazine, and the like.

Another group of amines suitable for use in this invention are branched polyalkylene polyamines. The branched polyalkylene polyamines are polyalkylene polyamines wherein the branched group is a side chain containing on the average at least one nitrogen-bonded aminoalkylene

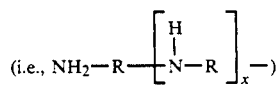

group per nine amino units present on the main chain; for example, 1–4 of such branched chains per nine units on the main chain, but preferably one side chain unit per nine main chain units. Thus, these polyamines contain at least three primary amino groups and at least one tertiary amino group. These amines may be expressed by the formula:

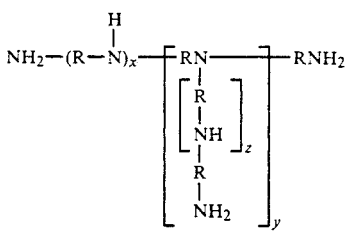

wherein R is an alkylene group such as ethylene, propylene, butylene and other homologs (both straight chained and branched), etc., but preferably ethylene; and x, y and z are integers; x is in the range of from about 4 to about 24 or more, preferably from about 6 to about 18; y is in the range of from 1 to about 6 or more, preferably from 1 to about 3; and z is in the range of from zero to about 6, preferably from zero to about 1. The x and y units may be sequential, alternative, orderly or randomly distributed. A useful class of such polyamines includes those of the formula:

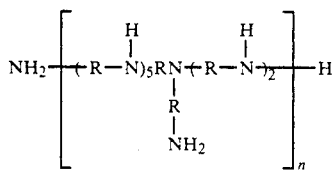

wherein n is an integer in the range of from 1 to about 20 or more, preferably in the range of from 1 to about 3, and R is preferably ethylene, but may be propylene, butylene, etc. (straight chained or branched). Useful embodiments are represented by the formula:

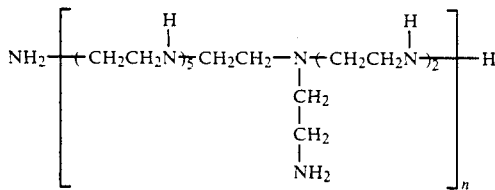

wherein n is an integer in the range of 1 to about 3. The groups within the brackets may be joined in a head-to-head or a head-to-tail fashion. U.S. Pat. Nos. 3,200,106 and 3,259,578 are incorporated herein by reference for their disclosures relative to said polyamines.

Suitable polyamines also include polyoxyalkylene polyamines, e.g., polyoxyalkylene diamines and polyoxyalkylene triamines, having average molecular weights ranging from about 200 to about 4000, preferably from about 400 to 2000. Examples of these polyoxyalkylene polyamines include those amines represented by the formula:

$NH_2$-Alkylene—O—Alkylene—$_m NH_2$ wherein m has a value of from about 3 to about 70, preferably from about 10 to about 35.

R—Alkylene—O—Alkylene—$_n NH_2]_{3-6}$ wherein n is a number in the range of from 1 to about 40, with the proviso that the sum of all of the n's is from about 3 to about 70 and generally from about 6 to about 35, and R is a polyvalent saturated hydrocarbyl group of up to about 10 carbon atoms having a valence of from about 3 to about 6. The alkylene groups may be straight or branched chains and contain from 1 to about 7 carbon atoms, and usually from 1 to about 4 carbon atoms. The various alkylene groups present within the above formulae may be the same or different.

More specific examples of these polyamines include:

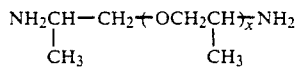

wherein x has a value of from about 3 to about 70, preferably from about 10 to 35; and

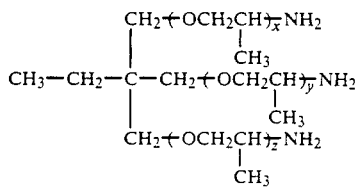

wherein $x+y+z$ have a total value ranging from about 3 to about 30, preferably from about 5 to about 10.

Useful polyoxyalkylene polyamines include the polyoxyethylene and polyoxypropylene diamines and the polyoxypropylene triamines having average molecular weights ranging from about 200 to about 2000. The polyoxyalkylene polyamines are commercially available from the Jefferson Chemical Company, Inc. under the trade name "Jeffamine". U.S. Pat. Nos. 3,804,763 and 3,948,800 are incorporated herein by reference for their disclosure of such polyoxyalkylene polyamines.

Useful polyamines are the alkylene polyamines, including the polyalkylene polyamines, as described in more detail hereafter. The alkylene polyamines include those conforming to the formula:

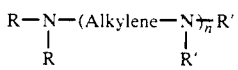

wherein n is from 1 to about 10, preferably from 1 to about 7; each R and R' is independently a hydrogen atom, a hydrocarbyl group or a hydroxy-substituted hydrocarbyl group having up to about 700 carbon atoms, preferably up to about 100 carbon atoms, more preferably up to about 50 carbon atoms, more preferably up to about 30 carbon atoms, with the proviso that at least one of R and at least one of R' are hydrogen; and the "Alkylene" group has from about 1 to about 18 carbon atoms, preferably from 1 to about 4 carbon atoms, with the preferred Alkylene being ethylene or propylene. Useful alkylene polyamines are those wherein each R and each R' is hydrogen with the ethylene polyamines, and mixtures of ethylene polyamines being particularly preferred. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines that are useful include ethylene diamine, diethylene triamine, triethylene tetramine, tetraethylene pentamine, pentaethylene hexamine, propylene diamine, trimethylene diamine, hexamethylene diamine, octamethylene diamine, di(heptamethylene) triamine, tripropylene tetramine, tetraethylene pentamine, trimethylene diamine, pentaethylene hexamine, di(trimethylene) triamine, N-(2-aminoethyl) piperazine, 1,4-bis(2-aminoethyl) piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are described in detail under the heading "Diamines and Higher Amines, Aliphatic" in The Encyclopedia of Chemical Technology, Third Edition, Kirk-Othmer, Volume 7, pp. 580-602, a Wiley-Interscience Publication, John Wiley and Sons, 1979, these pages being incorporated herein by reference. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Alkoxylated alkylene polyamines (e.g., N,N-(diethanol)-ethylene diamine) can be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

(2) Polyols Useful as Component (C)

The polyols or polyhydric alcohols useful as component (C) include those compounds of the general formula:

$$R_1(OH)_m$$

wherein $R_1$ is a monovalent or polyvalent organic group joined to the —OH groups through carbon-to-oxygen bonds (that is, —COH wherein the carbon is not part of a carbonyl group) and m is an integer of from 2 to about 10, preferably 2 to about 6. These alcohols can be aliphatic, cycloaliphatic, aromatic, and heterocyclic, including aliphatic-substituted cycloaliphatic alcohols, aliphatic-substituted aromatic alcohols, aliphatic-substituted heterocyclic alcohols, cycloaliphatic-substituted aliphatic alcohols, cycloaliphatic-substituted heterocyclic alcohols, heterocyclic-substituted aliphatic alcohols, heterocyclic-substituted cycloaliphatic alcohols, and heterocyclic-substituted aromatic alcohols. Except for the polyoxyalkylene alcohols, the polyhydric alcohols corresponding to the formula $R_1(OH)_m$ preferably contain not more than about 40 carbon atoms, more preferably not more than about 20 carbon atoms. The alcohols may contain non-hydrocarbon substituents or groups which do not interfere with the reaction of the alcohols with the hydrocarbyl-substituted carboxylic acids or anhydrides of this invention. Such non-hydrocarbon substituents or groups include lower alkoxy, lower alkyl, mercapto, nitro, and interrupting groups such as —O— and —S— (e.g., as in such groups as —CH$_2$CH$_2$—X—CH$_2$CH$_2$ where X is —O— or —S—).

Useful polyoxyalkylene alcohols and derivatives thereof include the hydrocarbyl ethers and the carboxylic acid esters obtained by reacting the alcohols with various carboxylic acids. Illustrative hydrocarbyl groups are alkyl, cycloalkyl, alkylaryl, aralkyl, alkylaryl alkyl, etc., containing up to about 40 carbon atoms. Specific hydrocarbyl groups include methyl, butyl, dodecyl, tolyl, phenyl, naphthyl, dodecylphenyl, p-octylphenyl ethyl, cyclohexyl, and the like. Carboxylic acids useful in preparing the ester derivatives are mono- or polycarboxylic acids such as acetic acid, valeric acid, lauric acid, stearic acid, succinic acid, and alkyl or alkenyl-substituted succinic acids wherein the alkyl or alkenyl group contains up to about 20 carbon atoms. Members of this class of alcohols are commercially available from various sources; e.g., PLURONICS, polyols available from Wyandotte Chemicals Corporation; POLYGLYCOL 112-2, a liquid triol derived from ethyleneoxide and propylene-oxide available from Dow Chemical Co.; and TERGITOLS, dodecylphenyl or nonylphenyl polyethylene glycol ethers, and UCONS, polyalkylene glycols and various derivatives thereof, both available from Union Carbide Corporation. However, the alcohols used must have an average of at least one free alcoholic hydroxyl group per molecule of polyoxyalkylene alcohol. For purposes of describing these polyoxyalkylene alcohols, an alcoholic hydroxyl group is one attached to a carbon atom that does not form part of an aromatic nucleus.

Alcohols useful in this invention also include alkylene glycols and polyoxyalkylene alcohols such as polyoxyethylene alcohols, polyoxypropylene alcohols, polyoxybutylene alcohols, and the like. These polyoxyalkylene alcohols (sometimes called polyglycols) can contain up to about 150 oxyalkylene groups, with the alkylene group containing from about 2 to about 8 carbon atoms. Such polyoxyalkylene alcohols are generally dihydric alcohols. That is, each end of the molecule terminates with an OH group. In order for such polyoxyalkylene alcohols to be useful, there must be at least two OH groups.

The polyhydric alcohols useful in this invention include polyhydroxy aromatic compounds. Polyhydric phenols and naphthols are useful hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain from 2 to about 4 hydroxy groups. The aromatic hydroxy compounds are illustrated by the following specific examples: resorcinol, catechol, p,p'-dihydroxy-biphenyl, hydroquinone, pyrogallol, phloroglucinol, hexylresorcinol, orcinol, etc.

The polyhydric alcohols preferably contain from 2 to about 10 hydroxy groups. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene groups contain from 2 to about 8 carbon atoms.

Other useful polyhydric alcohols include glycerol, monooleate of glycerol, monostearate of glycerol, monomethyl ether of glycerol, pentaerythritol, n-butyl ester of 9,10-dihydroxy stearic acid, methyl ester of 9,10-dihydroxy stearic acid, 1,2-butanediol, 2,3-hexanediol, 2,4-hexanediol, pinacol, erythritol, arabitol, sorbitol, mannitol, 1,2-cyclohexanediol, and xylene glycol. Carbohydrates such as sugars, starches, celluloses, and so forth likewise can be used. The carbohydrates may be exemplified by glucose, fructose, sucrose, rhamose, mannose, glyceraldehyde, and galactose.

Polyhydric alcohols having at least 3 hydroxyl groups, some, but not all of which have been esterified with an aliphatic monocarboxylic acid having from about 8 to about 30 carbon atoms such as octanoic acid, oleic acid, stearic acid, linoleic acid, dodecanoic acid or tall oil acid are useful. Further specific examples of such partially esterified polyhydric alcohols are the monooleate of sorbitol, distearate of sorbitol, monooleate of glycerol, monostearate of glycerol, di-dodecanoate of erythritol, and the like.

Useful alcohols also include those polyhydric alcohols containing up to about 12 carbon atoms, and especially those containing from about 3 to about 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl)cyclohexanol, 1,10-decanediol, digitalose, and the like. Aliphatic alcohols containing at least about 3 hydroxyl groups and up to about 10 carbon atoms are useful.

Useful polyhydric alcohols are the polyhydric alkanols containing from about 3 to about 10 carbon atoms and particularly, those containing about 3 to about 6 carbon atoms and having at least three hydroxyl groups. Such alcohols are exemplified by glycerol, erythritol, pentaerythritol, mannitol, sorbitol, 2-hydroxy-methyl-2-methyl-1,3-propanediol-(trimethylolethane), 2-hydroxymethyl-2-ethyl-1,3-propanediol(trimethylolpropane), 1,2,4-hexanetriol, and the like.

(3) Hydroxyamines Useful as Component (C)

The hydroxyamines can be primary or secondary amines. They can also be tertiary amines provided said tertiary amines also contain at least two hydroxyl groups. These hydroxyamines contain at least two >NH groups, at least two —NH2 groups, at least one —OH group and at least one >NH or —NH2 group, or at least two —OH groups. The terms "hydroxyamine" and "aminoalcohol" describe the same class of compounds and, therefore, can be used interchangeably.

The hydroxyamines can be primary or secondary alkanol amines or mixtures thereof. Such amines can be represented, respectfully, by the formulae:

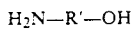

and

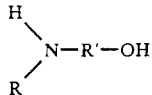

wherein R is a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Typically, R is a lower alkyl group of up to seven carbon atoms.

The hydroxyamines can also be ether N-(hydroxy-substituted hydrocarbyl)amines. These are hydroxyl-substituted poly(hydrocarbyloxy) analogs of the above-described primary and secondary alkanol amines (these analogs also include hydroxyl-substituted oxyalkylene analogs). Such N-(hydroxyl-substituted hydrocarbyl) amines can be conveniently prepared by reaction of epoxides with afore-described amines and can be represented by the formulae:

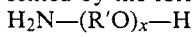

and

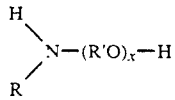

wherein x is a number from about 2 to about 15 and R and R' are as described above.

Polyamine analogs of these hydroxy amines, particularly alkoxylated alkylene polyamines (e.g., N,N-(diethanol)-ethylene diamine) can also be used. Such polyamines can be made by reacting alkylene amines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the afore-described primary or secondary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

Examples of the N-(hydroxyl-substituted hydrocarbyl) amines include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m-and p-aminophenol, N-(hydroxyl ethyl) piperazine, N,N'-di(hydroxyl ethyl) piperazine, and the like.

Further hydroxyamines are the hydroxy-substituted primary amines described in U.S. Pat. No. 3,576,743 by the general formula $$R_a - NH_2$$

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a - NH_2$ wherein $R_a$ is a monoor polyhydroxy-substituted alkyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris-(hydroxymethyl) amino methane (also known as trismethylolamino methane), 2-amino-1-butanol, ethanolamine, beta-(beta-hydroxyethoxy)-ethyl amine, glucamine, glusoamine, 4-amino-3-hydroxy-3-methyl-1-buten (which can be prepared according to procedures known in the art by reacting isopreneoxide with ammonia), N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylolaminomethane and the like. U.S. Pat. No. 3,576,743 is incorporated herein by reference.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxy-alkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropylsubstituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

Components (A)(II) and (B)(II)

Components (A)(II) and (B)(II) can be the same or different, but preferably are the same. The amines useful as component (A)(II) and (B)(II) in preparing the salt compositions of the invention include ammonia, and the primary amines, secondary amines and hydroxyamines discussed above as being useful as component (C). In addition to ammonia, the primary amines, secondary amines and hydroxyamines discussed above, the amines useful as components (A)(II) and (B)(II) also include primary and secondary monoamines, and tertiary mono- and polyamines. The primary and secondary monoamines that are useful as components (A)(II) and (B)(II) are described above under the sub-title "(1) Polyamines Useful as Component (C)" as being analogues of the polyamines described above. These primary and secondary monoamines include the aliphatic, cycloaliphatic and aromatic monoamines discussed above. The tertiary amines are analogous to the primary amines, secondary amines and hydroxyamines discussed above with the exception that they can be either monoamines or polyamines and the hydrogen atoms in the H-N< or -NH2 groups are replaced by hydrocarbyl groups.

The tertiary amines can be aliphatic, cycloaliphatic, aromatic or heterocyclic, including aliphatic-substituted aromatic, aliphatic-substituted cycloaliphatic, aliphatic-substituted heterocyclic, cycloaliphatic-substituted aliphatic, cycloaliphatic substituted aromatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted cycloaliphatic and heterocyclic-substituted aromatic amines. These tertiary amines may be saturated or unsaturated. If unsaturated, the amine is preferably free from acetylenic unsaturation. The tertiary amines may also contain non-hydrocarbon substituents or groups as long as these groups do not significantly interfere with the reaction of component (B) with component (A). Such non-hydrocarbon substituents or groups include lower alkoxy, lower alkyl, mercapto, nitro, and interrupting groups such as —O— and —S— (e.g., as in such groups as —CH₂CH₂—X—CH₂CH₂— where X is —O— or —S—).

The monoamines can be represented by the formula $$R' - N - R^2$$
$$\quad\ \ |$$
$$\quad\ \ R^3$$

wherein R', $R^2$ and $R^3$ are the same or different hydrocarbyl groups. Preferably, R', $R^2$ and $R^3$ are independently hydrocarbyl groups of from 1 to about 20 carbon atoms.

Examples of useful tertiary amines include trimethyl amine, triethyl amine, tripropyl amine, tributyl amine, monomethyldiethylamine, monoethyldimethyl amine, dimethylpropyl amine, dimethylbutyl amine, dimethylpentyl amine, dimethylhexyl amine, dimethylheptyl amine, dimethyloctyl amine, dimethylnonyl amine, dimethyldecyl amine, dimethylphenyl amine, N,N-dioctyl-1-octanamine, N,N-didodecyl-1-dodecanamine tricoco amine, trihydrogenated-tallow amine, N-methyl-dihydrogenated tallow amine, N,N-dimethyl-1-dodecanamine, N,N-dimethyl-1-tetradecanamine, N,N-dimethyl-1-hexadecanamine, N,N-dimethyl-1- octadecanamine, N,N-dimethylcocoamine, N,N-dimethylsoyaamine, N,N-dimethylhydrogenated tallow amine, etc.

Useful tertiary alkanol amines are represented by the formula

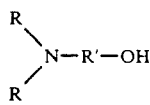

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formula represents the hydroxyl-substituted hydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms. The hydroxyamines can also be an ether N-(hydroxy-substituted hydrocarbyl)amine. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines can be conveniently prepared by reaction of epoxides with afore-described amines and can be represented by the formula:

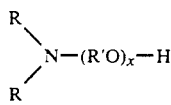

wherein x is a number from about 2 to about 15 and R and R' are as described above.

Useful polyamines include the alkylene polyamines discussed above as well as alkylene polyamines with only one or no hydrogens attached to the nitrogen atoms. Thus, the alkylene polyamines useful as components (A)(II) and (B)(II) include those conforming to the formula:

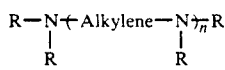

wherein n is from 1 to about 10, preferably from 1 to about 7; each R is independently a hydrogen atom, a hydrocarbyl group or a hydroxy-substituted hydrocarbyl group having up to about 700 carbon atoms, preferably up to about 100 carbon atoms, more preferably up to about 50 carbon atoms, more preferably up to about 30 carbon atoms; and the "Alkylene" group has from about 1 to about 18 carbon atoms, preferably from 1 to about 4 carbon atoms, with the preferred Alkylene being ethylene or propylene.

The alkali and alkaline earth metals that are useful as components (A)(II) and (B)(II) can be any alkali or alkaline earth metal. The alkali metals are preferred. Sodium and potassium are particularly preferred. The alkali and alkaline earth metal compounds that are useful include, for example, the oxides, hydroxides and carbonates. Sodium hydroxide and potassium hydroxide are particularly preferred.

Formation of the Salt Compositions

The salt compositions of the invention can be prepared by initially reacting the acylating agents (A)(I) and (B)(I) with component (C) to form an intermediate, and thereafter reacting said intermediate with components (A)(II) and (B)(II) to form the desired salt. An alternative method of preparing these salt compositions involves reacting components (A)(I) and (A)(II) with each other to form a first salt moiety, separately reacting components (B)(I) and (B)(II) with each other to form a second salt moiety, then reacting a mixture of these two salt moieties with component (C).

The ratio of reactants utilized in the preparation of the inventive salt compositions may be varied over a wide range. Generally, for each equivalent of each of the acylating agents (A)(I) and (B)(I), at least about one equivalent of component (C) is used. From about 0.1 to about 2 equivalents or more of components (A)(II) and (B)(II) are used for each equivalent of components (A)(I) and (B)(I), respectively. The upper limit of component (C) is about 2 equivalents of component (C) for each equivalent of component (A)(I), and about two equivalents of component (C) for each equivalent of component (B)(I). Generally the ratio of equivalents of components (A)(I) to (B)(I) is about 0.5 to about 2, with about 1:1 being preferred. Preferred amounts of the reactants are about 2 equivalents of the component (C) and from about 0.1 to about 2 equivalents of each of components (A)(II) and (B)(II) for each equivalent of each of components (A)(I) and (B)(I).

The number of equivalents of the acylating agents (A)(I) and (B)(I) depends on the total number of carboxylic functions present in each. In determining the number of equivalents for each of the acylating agents (A)(I) and (B)(I), those carboxyl functions which are not capable of reacting as a carboxylic acid acylating agent are excluded. In general, however, there is one equivalent of acylating agent (A)(I) and (B)(I) for each carboxy group in these acylating agents. For example, there would be two equivalents in an anhydride derived from the reaction of one mole of olefin polymer and one mole of maleic anhydride. Conventional techniques are readily available for determining the number of carboxyl functions (e.g., acid number, saponification number) and, thus, the number of equivalents of each of the acylating agents (A)(I) and (B)(I) can be readily determined by one skilled in the art.

An equivalent weight of a polyamine is the molecular weight of the polyamine divided by the total number of nitrogens present in the molecule. If the polyamine is to be used as component (C), tertiary amino groups are not counted. On the other hand, if the polyamine is to be used as component (A)(II) or (B)(II), tertiary amino groups are counted. Thus, ethylene diamine has an equivalent weight equal to one-half of its molecular weight; diethylene triamine has an equivalent weight equal to one-third its molecular weight. The equivalent weight of a commercially available mixture of polyalkylene polyamine can be determined by dividing the atomic weight of nitrogen (14) by the %N contained in the polyamine; thus, a polyamine mixture having a %N of 34 would have an equivalent weight of 41.2. An equivalent weight of ammonia or a monoamine is its molecular weight.

An equivalent weight of polyhydric alcohol is its molecular weight divided by the total number of hydroxyl groups present in the molecule. Thus, an equivalent weight of ethylene glycol is one-half its molecular weight.

An equivalent weight of a hydroxyamine which is to be used as component (C) is its molecular weight divided by the total number of —OH, >NH and —NH$_2$ groups present in the molecule. Thus, dimethylethanolamine when used as component (C) has an equivalent weight equal to its molecular weight; ethanolamine has an equivalent weight equal to one-half its molecular weight. On the other hand, if the hydroxyamine is to be used as components (A)(II) or (B)(II), an equivalent weight thereof would be its molecular weight divided by the total number of nitrogen groups present in the molecule. Thus, dimethylethanolamine, when used as component (A)(II) or (B)(II), would have an equivalent weight equal to its molecular weight; ethanolamine would also have an equivalent weight equal to its molecular weight.

An equivalent weight of an alkali or alkaline earth metal is its molecular weight. An equivalent weight of an alkali or alkaline earth metal compound is its molecular weight divided by the number of alkali or alkaline earth metal atoms present in the molecule.

The acylating agents (A)(I) and (B)(I) can be reacted with component (C) according to conventional ester- and/or amide-forming techniques. This normally involves heating acylating agents (A)(I) and (B)(I) with component (C), optionally in the presence of a normally liquid, substantially inert, organic liquid solvent/diluent. Temperatures of at least about 30° C. up to the decomposition temperature of the reaction component and/or product having the lowest such temperature can be used. This temperature is preferably in the range of about 50° C. to about 130° C., more preferably about 80° C. to about 100° C. when the acylating agents (A)(I) and (B)(I) are anhydrides. On the other hand, when the acylating agents (A)(I) and (B)(I) are acids, this temperature is preferably in the range of about 100° C. to about 300° C. with temperatures in the range of about 125° C. to about 250° C. often being employed.

The reactions between components (A)(I) and (B)(I), and (A)(II) and (B)(II) are carried out under salt forming conditions using conventional techniques. Typically, components (A)(I) and (A)(II), and (B)(I) and (B)(II) are mixed together and heated to a temperature in the range of about 20° C. up to the decomposition temperature of the reaction component and/or product having the lowest such temperature, preferably about 50° C. to about 130° C., more preferably about 80° C. to about 110° C.; optionally, in the presence of a normally liquid, substantially inert organic liquid solvent/diluent, until the desired product has formed.

The product of the reaction between components (A)(I) and (B)(I), and (A)(II) and (B)(II), respectively, must contain at least some salt linkage to permit said product to be effective as an emulsifier in accordance with the invention. Preferably at least about 10%, more preferably at least about 30%, more preferably at least about 50%, more preferably at least about 70%, and advantageously up to about 100% of components (A)- (II) and (B)(II) that react with the acylating agents (A)(I) and (B)(I), respectively, form a salt linkage.

The following examples illustrate the preparation of the salt compositions of this invention. Unless otherwise indicated, in the following examples and elsewhere in the specification and claims, all parts and percentages are by weight, and all temperatures are in degrees centigrade.

EXAMPLE 1

1120 parts of polyisobutylene (number average molecular weight=950) substituted succinic anhydride and 325 parts of a low molecular weight hydrocarbyl-substituted succinic anhydride derived from one mole of a C$_{16}$ alpha-olefin and one mole of maleic anhydride are heated to a temperature of 93° C. with stirring and maintained at that temperature for one hour. 62 parts of ethylene glycol are added to the mixture. The mixture is maintained at a temperature of 93–105° C. for 2 hours. 178 parts of dimethylethanolamine are added to the mixture over a period of 0.5 hour. The mixture is maintained at 93–104° C. for 2.5 hours then cooled to 70° C. to provide the desired product.

EXAMPLE 2

1370 parts of polyisobutylene (number average molecular weight=1200), substituted succinic anhydride, 260 parts of a low molecular weight hydrocarbylsubstituted succinic anhydride derived from one mole of a C$_{12}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE 3

1120 parts of the polyisobutylene substituted succinic anhydride identified in Example 1, 260 parts of a low molecular weight hydrocarbyl-substituted succinic anhydride derived from one mole of a C$_{12}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE 4

1370 parts of the polyisobutylene substituted succinic anhydride identified in Example 2, 325 parts of a low molecular weight hydrocarbyl-substituted succinic anhydride derived from one mole of a C$_{16}$ alpha-olefin and one mole of maleic anhydride, and 104 parts of neopentyl glycol are reacted under ester-forming conditions to form an intermediate product. 234 parts of diethylethanolamine are reacted with the intermediate product under salt-forming conditions to form a desired salt composition.

EXAMPLE 5

1120 parts of the polyisobutylene substituted succinic anhydride identified in Example 1, 325 parts of a low molecular weight hydrocarbyl-substituted succinic anhydride derived from one mole of a C$_{16}$ alpha-olefin and one mole of maleic anhydride, and 75 parts of N-methylethanolamine are reacted under ester-amide-forming conditions to form an intermediate product.

298 parts of triethanolamine are reacted with the intermediate product under salt-forming conditions to form a desired salt composition.

EXAMPLE 6

1120 parts of the polyisobutylene-substituted succinic anhydride identified in Example 1, 325 parts of a low-molecular weight hydrocarbyl-substituted succinic anhydride derived from a $C_{16}$ alpha-olefin and maleic anhydride, and 75 parts of N-methylethanolamine are reacted under ester-amide forming conditions to form an intermediate product. 179 parts of triethylamine are reacted with the intermediate product under salt-forming conditions to form a desired salt composition.

EXAMPLE 7

1120 parts of the polyisobutylene-substituted succinic anhydride identified in Example 1, 325 parts of a low-molecular weight hydrocarbyl-substituted succinic anhydride derived from a $C_{16}$ alpha-olefin and maleic anhydride, and 106 parts of diethylene glycol are reacted under ester-forming conditions to form an intermediate product. 234 parts of diethylethanolamine are reacted with the intermediate product under salt-forming conditions to form a desired salt composition.

EXAMPLE 8

1120 parts of the polyisobutylene-substituted succinic anhydride identified in Example 1, 325 parts of a low-molecular weight hydrocarbyl-substituted succinic anhydride derived from a $C_{16}$ alpha-olefin and maleic anhydride, and 75 parts of propylene glycol are reacted under ester-forming conditions to form an intermediate product. 210 parts of diethanolamine are reacted with the intermediate product under salt-forming conditions to form a desired salt composition.

EXAMPLE 9

1370 parts of the polyisobutylene-substituted succinic anhydride identified in Example 2, 325 parts of a low-molecular weight hydrocarbyl-substituted succinic anhydride derived from a $C_{16}$ alpha-olefin and maleic anhydride, and 118 parts of hexylene glycol are reacted under ester-forming conditions to form an intermediate product. 179 parts of triethylamine are reacted with the intermediate product under salt-forming conditions to form a desired salt composition.

EXAMPLE 10

1120 parts of the polyisobutylene-substituted succinic anhydride identified in Example 1, 260 parts of a low-molecular weight hydrocarbyl-substituted succinic anhydride derived from a $C_{12}$ alpha-olefin and maleic anhydride, and 104 parts of pentanediol are reacted under ester-forming conditions to form an intermediate product. 298 parts of triethanolamine are reacted with the intermediate product under salt-forming conditions to form a desired salt composition.

EXAMPLE 11

Two equivalents of the polyisobutylene-substituted succinic anhydride identified in Example 1, two equivalents of a low molecular weight hydrocarbyl-substituted succinic anhydride derived from one mole of a $C_{16-18}$ alpha-olefin fraction and one mole of maleic anhydride, and two equivalents of ethylene diamine are reacted under amide-forming conditions to form an intermediate product. Two equivalents of NaOH are reacted with the intermediate product under salt-forming conditions to form a desired salt composition.

EXAMPLE 12

Two equivalents of the polyisobutylene-substituted succinic anhydride identified in Example 1, two equivalents of a low molecular weight hydrocarbyl-substituted succinic anhydride derived from one mole of a $C_{12}$ alpha-olefin and one mole of maleic anhydride, and two equivalents of N-methylethanolamine are reacted under ester-amide-forming conditions to form an intermediate product. Two equivalents of calcium hydroxide are reacted with the intermediate product under salt-forming conditions to form a desired salt composition.

EXAMPLE 13

Two equivalents of the polyisobutylene-substituted succinic anhydride identified in Example 1, two equivalents of a low molecular weight hydrocarbyl-substituted succinic anhydride derived from one mole of a $C_8$ alpha-olefin and one mole of maleic anhydride, and two equivalents of ethylene diamine are reacted under amideforming conditions to form an intermediate product. Two equivalents of ammonia are reacted with the intermediate product under salt-forming conditions to form a desired salt composition.

EXAMPLE 14

Two equivalents of the polyisobutylene-substituted succinic anhydride identified in Example 1, two equivalents of a low molecular weight hydrocarbyl-substituted succinic anhydride derived from one mole of a $C_{12-16}$ alpha-olefin fraction and one mole of maleic anhydride, and two equivalents of ethylene glycol are reacted under ester-forming conditions to form an intermediate product. Two equivalents of potassium carbonate are reacted with the intermediate product under saltforming conditions to form a desired salt composition.

EXAMPLE 15

Two equivalents of a $C_{20}$ hydrocarbyl-substituted succinic anhydride, two equivalents of a low molecular weight hydrocarbyl-substituted succinic anhydride derived from one mole of a $C_{18}$ alpha-olefin and one mole of maleic anhydride, and two equivalents of ethylene diamine are reacted under amide-forming conditions to form an intermediate product. Two equivalents of dimethylethanolamine are reacted with the intermediate product under salt-forming conditions to form a desired salt composition.

EXAMPLE 16

Two equivalents of a $C_{500}$-hydrocarbyl-substituted succinic anhydride, two equivalents of a low molecular weight hydrocarbyl-substituted succinic anhydride derived from one mole of a $C_8$ alpha-olefin and one mole of maleic anhydride, and two equivalents of ethylene glycol are reacted under ester-forming conditions to form an intermediate product. Two equivalents of ammonia are reacted with the intermediate product under salt-forming conditions to form a desired salt composition.

EXAMPLE 17

Two equivalents of the polyisobutylene-substituted succinic anhydride identified in Example 1, two equivalents of a low molecular weight hydrocarbyl-substituted succinic anhydride derived from one mole of a $C_{16}$ alpha-olefin and one mole of maleic anhydride, and two equivalents of ethylene glycol are reacted under ester-forming conditions to form an intermediate product. Two equialents of sodium hydroxide are reacted with the intermediate product under salt-forming conditions to form a desired salt composition.

EXAMPLE 18

Two equivalents of the polyisobutylene-substituted succinic anhydride identified in Example 1, two equivalents of a low molecular weight hydrocarbyl-substituted succinic anhydride derived from one mole of a $C_{16-18}$ alpha-olefin fraction and one mole of maleic anhydride, and two equivalents of ethylene diamine are reacted under amide-forming conditions to form an intermediate product. Two equivalents of morpholine are reacted with the intermediate product under salt-forming conditions to form a desired salt composition.

EXAMPLE 19

Two equivalents of the polyisobutylene-substituted succinic anhydride identified in Example 1, two equivalents of maleic anhydride, and two equivalents of ethylene glycol are reacted under ester-forming conditions to form an intermediate product. Two equivalents of dimethylethanolamine are reacted with the intermediate product under salt-forming conditions to form a desired salt composition.

Explosive Compositions

The explosive compositions of the invention are water-in-oil emulsions which, in one embodiment, are cap-sensitive water-in-oil explosive emulsions. These explosive emulsions employ the salt compositions of the invention as emulsifiers. The inventive explosive emulsions comprise a discontinuous oxidizer phase comprising at least one oxygen-supplying component, a continuous organic phase comprising at least one carbonaceous fuel, and an emulsifying amount of at least one of the salt compositions of the invention.

The continuous organic phase is preferably present at a level of at least about 2% by weight, more preferably in the range of from about 2% to about 15% by weight, more preferably in the range of from about 3.5% to about 8% by weight based on the total weight of explosive emulsion. The discontinuous oxidizer phase is preferably present at a level of at least about 85% by weight, more preferably at a level in the range of from about 85% to about 98% by weight, more preferably from about 92% to about 96.5% by weight based on the total weight of said explosive emulsion. The salt compositions of the invention are preferably present at a level in the range of from about 4% to about 40% by weight, more preferably from about 12% to about 20% by weight based on the total weight of the organic phase. The oxygen-supplying component is preferably present at a level in the range of from about 70% to about 95% by weight, more preferably from about 85% to about 92% by weight, more preferably from about 87% to about 90% by weight based on the total weight of the oxidizer phase. The water is preferably present at a level in the range of about 5% to about 30% by weight, more preferably about 8% to about 15% by weight, more preferably about 10% to about 13% by weight based on the weight of the oxidizer phase.

The carbonaceous fuel that is useful in the explosive emulsions of the invention can include most hydrocarbons, for example, paraffinic, olefinic, naphthenic, aromatic, saturated or unsaturated hydrocarbons, and is typically in the form of an oil or a wax or a mixture thereof. In general, the carbonaceous fuel is a water-immiscible, emulsifiable hydrocarbon that is either liquid or liquefiable at a temperature of up to about 95° C., and preferably between about 40° C. and about 75° C. Oils from a variety of sources, including natural and synthetic oils and mixtures thereof can be used as the carbonaceous fuel.

Natural oils include animal oils and vegetable oils (e.g., castor oil, lard oil) as well as solventrefined or acid-refined mineral oils of the paraffinic, naphthenic, or mixed paraffin-naphthenic types. Oils derived from coal or shale are also useful. Synthetic oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like.

Esters useful as synthetic oils also include those made from C5 to C12 monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another class of useful oils. These include tetraethyl-silicate, tetraisopropylsilicate, tetra-(2-ethylhexyl)-silicate, tetra-(4-methyl-hexyl)-silicate, tetr(p-tert-butylphenyl)-silicate, hexyl-(4-methyl-2-pentoxy)-di-siloxane, poly(methyl)siloxanes, poly-(methylphenyl)-siloxanes, etc. Other useful synthetic oils include liquid esters of phosphorus-containing acid (e.g., tricresyl phosphate, trioctyl phosphate, diethyl ester of decane phosphonic acid, etc.), polymeric tetrahydrofurans, and the like.

Unrefined, refined and rerefined oils (and mixtures of each with each other) of the type disclosed hereinabove can be used. Unrefined oils are those obtained directly from a natural or synthetic source without further purification treatment. For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA; and a mineral oil available from Pennzoil under the trade designation N-750-HT.

The carbonaceous fuel can be any wax having melting point of at least about 25° C., such as petrolatum wax, microcrystalline wax, and paraffin wax, mineral waxes such as ozocerite and montan wax, animal waxes such as spermacetic wax, and insect waxes such as beeswax and Chinese wax. Useful waxes include waxes identified by the trade designation MOBILWAX 57 which is available from Mobil Oil Corporation; D02764 which is a blended wax available from Astor Chemical Ltd.; and VYBAR which is available from Petrolite Corporation. Preferred waxes are blends of microcrystalline waxes and paraffin.

In one embodiment, the carbonaceous fuel includes a combination of a wax and an oil. In this embodiment, the wax content is at least about 25% and preferably ranges from about 25% to about 90% by weight of the organic phase, and the oil content is at least about 10% and preferably ranges from about 10% to about 75% by weight of the organic phase. These mixtures are particularly suitable for use in cap-sensitive explosive emulsions.

While its presence is not necessary, the explosive emulsions can also contain up to about 15% by weight of an auxiliary fuel, such as aluminum, aluminum alloys, magnesium, and the like. Particulate aluminum is a preferred auxiliary fuel.

The oxygen-supplying component is preferably at least one inorganic oxidizer salt such as ammonium, alkali or alkaline earth metal nitrate, chlorate or perchlorate. Examples include ammonium nitrate, sodium nitrate, calcium nitrate, ammonium chlorate, sodium perchlorate and ammonium perchlorate. Ammonium nitrate is especially preferred. Mixtures of ammonium nitrate and sodium or calcium nitrate are also preferred. In one embodiment, inorganic oxidizer salt comprises principally ammonium nitrate, although up to about 25% by weight of the oxidizer phase can comprise either another inorganic nitrate (e.g., alkali or alkaline earth metal nitrate) or an inorganic perchlorate (e.g., ammonium perchlorate or an alkali or alkaline earth metal perchlorate) or a mixture thereof.

In one embodiment of the invention, closedcell, void-containing materials are used as sensitizing components. The term "closed-cell, void-containing material" is used herein to mean any particulate material which comprises closed cell, hollow cavities. Each particle of the material can contain one or more closed cells, and the cells can contain a gas, such as air, or can be evacuated or partially evacuated. In one embodiment of the invention, sufficient closed cell void containing material is used to yield a density in the resulting emulsion of from about 0.8 to about 1.35 g/cc, more preferably about 0.9 to about 1.3 g/cc, more preferably about 1.1 to about 1.3 g/cc. In general, the emulsions of the subject invention can contain up to about 15% by weight, preferably from about 0.25% to about 15% by weight of the closed cell void containing material. Preferred closed cell void containing materials are discrete glass spheres having a particle size within the range of about 10 to about 175 microns. In general, the bulk density of such particles can be within the range of about 0.1 to about 0.4 g/cc. Useful glass microbubbles which can be used are the microbubbles sold by 3M Company and which have a particle size distribution in the range of from about 10 to about 160 microns and a nominal size in the range of about 60 to 70 microns, and densities in the range of from about 0.1 to about 0.4 g/cc.; these include microbubbles distributed under the trade designation B15/250. Other useful glass microbubbles are sold under the trade designation of ECCOSPHERES by Emerson & Cumming, Inc., and generally have a particle size range from about 44 to about 175 microns and a bulk density of about 0.15 to about 0.4 g/cc. Other suitable microbubbles include the inorganic microspheres sold under the trade designation of Q-CEL by Philadelphia Quartz Company. The closed cell void containing material can be made of inert or reducing materials. For example, phenol-formaldehyde microbubbles can be utilized within the scope of this invention. If the phenol-formaldehyde microbubbles are utilized, the microbubbles themselves are a fuel component for the explosive and their fuel value should be taken into consideration when designing a water-in-oil emulsion explosive composition. Another closed cell void containing material which can be used within the scope of the subject invention is the saran microspheres sold by Dow Chemical Company. The saran microspheres have a diameter of about 30 microns and a particle density of about 0.032 g/cc. Because of the low bulk density of the saran microspheres, it is preferred that only from about 0.25 to about 1% by weight thereof be used in the water-in-oil emulsions of the subject invention.

Gas bubbles which are generated in-situ by adding to the composition and distributing therein a gasgenerating material such as, for example, an aqueous solution of sodium nitrite, can also be used can be used to sensitize the explosive emulsions. Other suitable sensitizing components which may be employed alone or in addition to the foregoing include insoluble particulate solid self-explosives such as, for example, grained or flaked TNT, DNT, RDX and the like and water-soluble and/or hydrocarbon-soluble organic sensitizers such as, for example, amine nitrates, alkanolamine nitrates, hydroxyalkyl nitrates, and the like. The explosive emulsions of the present invention may be formulated for a wide range of applications. Any combination of sensitizing components may be selected in order to provide an explosive composition of virtually any desired density, weight-strength or critical diameter. The quantity of solid self-explosive ingredients and of water-soluble and/or hydrocarbon-soluble organic sensitizers may comprise up to about 40% by weight of the total explosive composition. The volume of the occluded gas component may comprise up to about 50% of the volume of the total explosive composition.

Optional additional materials may be incorporated in the explosive emulsions of the invention in order to further improve sensitivity, density, strength, rheology and cost of the final explosive. Typical of materials found useful as optional additives include, for example, particulate non-metal fuels such as sulfur, gilsonite and the like, particulate inert materials such as sodium chloride, barium sulphate and the like, water phase or hydrocarbon phase thickeners such as guar gum, polyacrylamide, carboxymethyl or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art. The quantities of optional additional materials used may comprise up to about 50% by weight of the total explosive emulsion.

The general criteria for cap-sensitivity is that the explosive be sensitive to a No. 8 blasting cap at a cartridge diameter of 1.25 inch under normal temperature conditions. The cap-sensitive explosive emulsions of the present invention are shelf stable, which means they exhibit shelf stability of at least six months and typically one year or more.

A preferred method for making the explosive emulsions of the invention comprises the steps of (1) mixing water, inorganic oxidizer salts (e.g., ammonium nitrate) and, in certain cases, some of the supplemental water-soluble compounds, in a first premix, (2) mixing the carbonaceous fuel, the emulsifying salt compositions of the invention and any other optional oil-soluble compounds, in a second premix and (3) adding the first premix to the second premix in a suitable mixing apparatus, to form a water-in-oil emulsion. The first premix is heated until all the salts are completely dissolved and the solution may be filtered if needed in order to remove any insoluble residue. The second premix is also heated to liquefy the ingredients. Any type of apparatus capable of either low or high shear mixing can be used to prepare these water-in-oil emulsions. Closedcell void containing materials, gas-generating materials, solid self-explosive ingredients such as particulate TNT, solid fuels such as aluminum or sulfur, inert materials such as barytes or sodium chloride, undissolved solid oxidizer salts and other optional materials, if employed, are added to the emulsion and simply blended until homogeneously dispersed throughout the composition.

The water-in-oil explosive emulsions of the invention can also be prepared by adding the second premix liquefied organic solution phase to the first premix hot aqueous solution phase with sufficient stirring to invert the phases. However, this method usually requires substantially more energy to obtain the desired dispersion than does the preferred reverse procedure. Alternatively, these water-in-oil explosive emulsions are particularly adaptable to preparation by a continuous mixing process where the two separately prepared liquid phases are pumped through a mixing device wherein they are combined and emulsified.

The salt compositions of this invention can be added directly to the inventive explosive emulsions. They can also be diluted with a substantially inert, normally liquid organic diluent such as mineral oil, naphtha, benzene, toluene or xylene, to form an additive concentrate. These concentrates usually contain from about 10% to about 90% by weight of the salt composition of this invention and may contain, in addition, one or more other additives known in the art or described hereinabove.

An advantage of the present invention is that by using the salt compositions of the present invention as emulsifiers, explosive emulsions can be provided in gelatinous or semi-gelatinous forms that are dry to the touch and cuttable. These are important characteristics when using these explosive emulsions in the preparation of cap-sensitive explosive emulsions, particularly when such cap-sensitive explosive emulsions are used in the manufacture of explosive cartridges, especially small diameter (i.e., diameters of about 1.25 inches or smaller) cartridges.

Explosive cartridges within the scope of this invention can be made using techniques well known in the art. The cap-sensitive explosive emulsions of the invention are particularly suitable for making cartridges on cartridging machines such as the type available from Niepmann under the trade designation ROLLEX.

The following Examples A-G are illustrative of cap-sensitive water-in-oil explosive emulsions within the scope of the invention. Examples A-E, which are identified in Table I below, are prepared as follows. The organic phase is prepared using the wax and oil indicated in Table I and the product of Example 1. The oxidizer phase contains 78.5% $NH_4NO_3$, 10.7% $NaNO_3$, and 10.8% $H_2O$. The weight ratio of the oxidizer phase to the organic phase is 95/5. The organic phase is melted at 90° C. The oxidizer phase is heated to 104° C. The oxidizer phase is added to the organic phase with stirring using a Sunbeam Mixmaster mixer at 50–100% on the variac for one minute. The emulsions are mixed or "worked" an additional six minutes in the Sunbeam Mixmaster mixer at 100% on the variac. The viscosity of each emulsion and initial emulsion temperatures are indicated in Table I. A sample of each emulsion is stored at 49° C. for 4 days and then at 70° C. for 2 days. After that time the emulsions are removed and stored at room temperature. The stability of each emulsion is observed overtime and reported in Table I. The penetration of the samples is measured using a 159 gram cone and apparatus.

TABLE I

|  | A | B | C | D | E |
|---|---|---|---|---|---|
| Product of Ex. 1, (% of organic phase) | 20 | 20 | 20 | 15 | 25 |
| Mineral oil, (% of organic phase) | 20 | 32 | 40 | 20 | 15 |
| 50:50 blend of microcrystalline wax and paraffin wax, (% of organic phase) | 60 | 48 | 40 | 65 | 60 |
| Initial Viscosity (cPs × 10³/°F.) | 115/170 | 125/162 | 120/166 | 95/166 | 160/166 |
| Avg. Penetration at Room Temp. (mm) | 8.95 | 10.7 | 11.5 | 8.4 | 8.8 |
| Storage Stability @ Room Temp. (Appearance/Days) | OK/37 | OK/37 | OK/42 | OK/33 | OK/33 |
| Storage Stability @ 120° F. (Appearance/Days) | OK/37 | OK/37 | OK/42 | OK/33 | OK/33 |
| Storage Stability @ 158° F. (Appearance/Days) | OK/37 | OK/37 | OK/42 | OK/33 | OK/33 |

Each of the emulsions identified in Table I are dry to the touch and cuttable.

Examples F and G which are identified in Table II below are prepared as follows. The oxidizer phase contains 78.5% $NH_4NO_3$, 10.7% $NaNO_3$, and 10.8% $H_2O$. The organic phase is prepared using the wax and oil indicated in Table II and the product of Example 1. The organic phase is melted at 90° C. The oxidizer is heated to 104° C. The oxidizer is added to the organic phase with stirring using a Sunbeam Mixmaster mixer at 50-100% on the variac for one minute. The ratio of oxidizer to organic phase, viscosity, and the amount of additional mixing or working in the Sunbeam Mixmaster mixer at 100% on the variac are indicated in Table II. Glass microbubbles (68-82 microns) are added to the hot emulsion at a level of 42.5 grams of beads per 100 grams of emulsion.

TABLE II

|  | F | G |
|---|---|---|
| Product of Ex. 1, (% of organic phase) | 20.4 | 20.0 |
| Mineral oil, (% of organic phase) | 20.4 | 20.0 |
| 50:50 blend of microcrystalline wax and paraffin wax, (% of organic phase) | 59.2 | 60.0 |
| Oxidizer/Organic phase ratio | 95.2/4.9 | 95.0/5.0 |
| Work, (min.) | 6.0 | 1.5 |
| Initial Viscosity, (cPs/°F.) | 142,000/ 166 | 77,000/ 180 |

Examples F and G are dry to the touch, cuttable, and stable at room temperature and after one hour at 90° C.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A composition comprising:
(A) at least one salt moiety derived from (A)(I) at least one high-molecular weight polycarobyxlic acylating agent, said acylating agent (A)(I) having at least one hydrocarbyl substituent having an average of from about 20 to about 500 carbon atoms, and (A)(II) one or more members selected from the group consisting of ammonia, at least one amine, at least one alkali or alkaline earth metal, and at least one alkali or alkaline earth metal compound;
(B) at least one salt moiety derived from (B)(I) at least one low-molecular weight polycarboxylic acylating agent, said acylating agent (B)(I) optionally having at least one hydrocarbyl substituent having an average of up to about 18 carbon atoms, and (B)(II) one or more members selected from the group consisting of ammonia, at least one amine, at least one alkali or alkaline earth metal, and at least one alkali or alkaline earth metal compound;
said moieties (A) and (B) being coupled together by (C) at least one compound having one or more functions selected from the group consisting of (i) two or more primary amino groups, (ii) two or more secondary amino groups, (iii) at least one primary amino group and at least one secondary amino group, (iv) at least two hydroxyl groups and (v) at least one primary or secondary amino group and at least one hydroxyl group.

2. The composition of claim 1 wherein (A)(I) is derived from at least one alpha-beta olefinically unsaturated carboxylic acid or acid-producing compound, said acid or acid-producing compound containing up to about 20 carbon atoms exclusive of the carboxyl groups.

3. The composition of claim 1 wherein (A)(I) is represented by the formulae

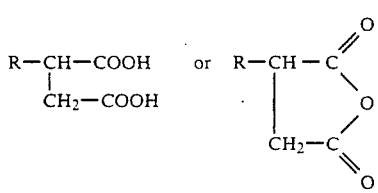

wherein R is said hydrocarbyl substituent of (A)(I).

4. The composition of claim 1 wherein said hydrocarbyl substituent of (A)(I) has an average of from about 30 to about 500 carbon atoms.

5. The composition of claim 1 wherein said hydrocarbyl substituent of (A)(I) has an average of from about 40 to about 500 carbon atoms.

6. The composition of claim 1 wherein said hydrocarbyl substituent of (A)(I) has an average of from about 50 to about 500 carbon atoms.

7. The composition of claim 1 wherein said hydrocarbyl substituent of (A)(I) is an alkyl or an alkenyl group.

8. The composition of claim 1 wherein said hydrocarbyl substituent of (A)(I) is a poly(isobutylene) group.

9. The composition of claim 1 wherein component (A)(II) comprises at least one monoamine.

10. The composition of claim 1 wherein component (A)(II) comprises at least one polyamine.

11. The composition of claim 1 wherein component (A)(II) comprises at least one primary, secondary and/or tertiary amine.

12. The composition of claim 1 wherein component (A)(II) comprises at least one aliphatic, cycloaliphatic and/or aromatic amine.

13. The composition of claim 1 wherein component (A)(II) comprises at least one alkylene polyamine of the formula

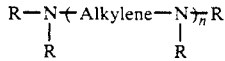

wherein n is a number of from 1 to about 10, each R is independently a hydrogen atom or a hydrocarbyl group or a hydroxy-substituted hydrocarbyl group having up to about 700 carbon atoms, and the Akylene group has from 1 to about 10 carbon atoms.

14. The composition of claim 1 wherein component (A)(II) comprises (a) at least one N-(hydroxyl-substituted hydrocarbyl) amine, (b) at least one hydroxyl-substituted poly(hydrocarbyloxy) analog of (a), or (c) a mixture of (a) and (b).

15. The composition of claim 1 wherein component (A)(II) comprises at least one alkanol amine containing up to about 40 carbon atoms.

16. The composition of claim 1 wherein component (A)(II) is selected from the group consisting of (a) primary, secondary and tertiary alkanol amines which can be represented correspondingly by the formulae

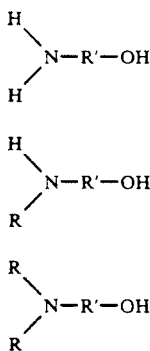

(b) hydroxyl-substituted oxyalkylene analogs of said alkanol amines represented by the formulae

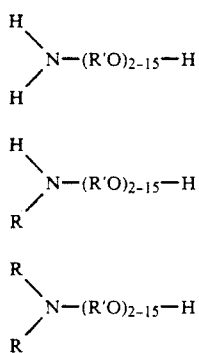

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c) mixtures of two of more of any of the above.

17. The composition of claim 1 wherein component (A)(II) comprises dimethylethanolamine.

18. The composition of claim 1 wherein component (A)(II) comprises ammonia.

19. The composition of claim 1 wherein component (A)(II) comprises at least one alkali metal.

20. The composition of claim 1 wherein component (A)(II) comprises sodium or potassium.

21. The composition of claim 1 wherein component (A)(II) comprises at least one alkaline earth metal.

22. The composition of claim 1 wherein component (A)(II) comprises at least one alkali metal oxide, hydroxide or carbonate.

23. The composition of claim 1 wherein component (A)(II) comprises at least one alkaline earth metal oxide, hydroxide or carbonate.

24. The composition of claim 1 wherein component (B)(I) is at least one compound selected from the group consisting of maleic acid, maleic anhydride, chloromaleic anhydride, malonic acid, succinic acid, succinic anhydride, glutaric acid, glutaric anhydride, adipic acid, pimelic acid, azelaic acid, sebacic acid, glutaconic acid, citraconic acid, itaconic acid, allyl succinic acid, cetyl malonic acid and tetrapropylene-substituted succinic anhydride.

25. The composition of claim 1 wherein (B)(I) is represented by the formulae

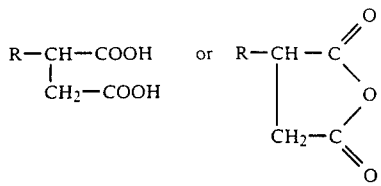

wherein R is said hydrocarbyl substituent of (B)(I).

26. The composition of claim 1 wherein said hydrocarbyl substituent of (B)(I) is derived from at least one compound selected from the group consisting of ethylene, propylene, 1-butene, isobutene, 1-pentene, 2-methyl-1-butene, 3-methyl-1-butene, 1-hexene, 1-heptene, 1-octene, styrene, 1-nonene, 1-decene, 1-undecene, 1-dodecene, 1-tridecene, 1-tetradecene, 1-pentadecene, 1-hexadecene, 1-heptadecene and 1-octadecene.

27. The composition of claim 1 wherein said hydrocarbyl substituent of (B)[I] is derived from at least one member within alpha-olefin fraction selected from the group consisting of $C_{15-18}$ alpha-olefins, $C_{12-16}$ alpha-olefins, $C_{14-16}$ alpha-olefins, $C_{14-18}$ alpha-olefins and $C_{16-18}$ alpha-olefins.

28. The composition of claim 1 wherein said hydrocarbyl substituent of (B)(I) has an average of from about 8 to about 18 carbon atoms.

29. The composition of claim 1 wherein said hydrocarbyl substituent of (B)(I) has an average of from about 12 to about 18 carbon atoms.

30. The composition of claim 1 wherein said hydrocarbyl substituent of (B)(I) is an alkyl or an alkenyl group.

31. The composition of claim 1 wherein component (B)(II) comprises at least one monoamine.

32. The composition of claim 1 wherein component (B)(II) comprises at least one polyamine.

33. The composition of claim 1 wherein component (B)(II) comprises at least one primary, secondary and/or tertiary amine.

34. The composition of claim 1 wherein component (B)(II) comprises at least one aliphatic, cycloaliphatic and/or aromatic amine.

35. The composition of claim 1 wherein component (B)(II) comprises at least one alkylene polyamine of the formula $$R-N(-\text{Alkylene}-N)_{\overline{n}}R$$
$$\quad | \qquad\qquad\qquad |$$
$$\quad R \qquad\qquad\qquad R$$

wherein n is a number of from 1 to about 10, each R is independently a hydrogen atom or a hydrocarbyl group or a hydroxy-substituted hydrocarbyl group having up to about 700 carbon atoms, and the Alkylene group has from 1 to about 10 carbon atoms.

36. The composition of claim 1 wherein component (B)(II) comprises (a) at least one N-(hydroxyl-substituted hydrocarbyl) amine, (b) at least one hydroxyl-substituted poly(hydrocarbyloxy) analog of (a), or (c) a mixture of (a) and (b).

37. The composition of claim 1 wherein component (B)(II) comprises at least one alkanol amine containing up to about 40 carbon atoms.

38. The composition of claim 1 wherein component (B)(II) is selected from the group consisting of (a) primary, secondary and tertiary alkanol amines which can be represented correspondingly by the formulae

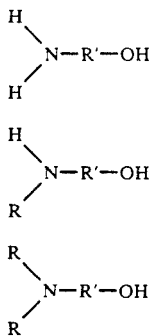

(b) hydroxyl-substituted oxyalkylene analogs of said alkanol amines represented by the formulae

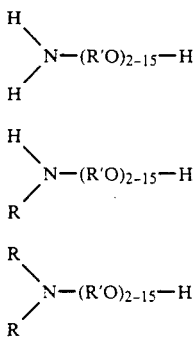

wherein each R is independently a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c) mixtures of two of more thereof.

39. The composition of claim 1 wherein component (B)(II) comprises dimethylethanolamine.

40. The composition of claim 1 wherein component (B)(II) comprises ammonia.

41. The composition of claim 1 wherein component (B)(II) comprises at least one alkali metal.

42. The composition of claim 1 wherein component (B)(II) comprises sodium or potassium.

43. The composition of claim 1 wherein component (B)(II) comprises at least one alkaline earth metal.

44. The composition of claim 1 wherein component (B)(II) comprises at least one alkali metal oxide, hydroxide or carbonate.

45. The composition of claim 1 wherein component (B)(II) comprises at least one alkaline earth metal oxide, hydroxide or carbonate.

46. The composition of claim 1 wherein component (C) comprises at least one polyamine.

47. The composition of claim 1 wherein component (C) comprises at least one aliphatic, cycloaliphatic or aromatic polyamine.

48. The composition of claim 1 wherein component (C) comprises at least one alkylene polyamine of the formula

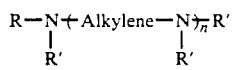

wherein n is a number in the range of from 1 to about 10, each R and R' is independently hydrogen or a hydrocarbyl group or a hydroxy-substituted hydrocarbyl group having up to about 700 carbon atoms, with the proviso that at least one of R and at least one of R' are hydrogen, and the Alkylene group has from 1 to about 10 carbon atoms.

49. The composition of claim 1 wherein component (C) comprises at least one polyol.

50. The composition of claim 1 wherein component (C) comprises at least one compound represented by the formula

$R(OH)_m$ wherein R is a monovalent or polyvalent organic group joined to the OH groups through carbon-to-oxygen bonds and m is an integer of from 2 to about 10.

51. The composition of claim 1 wherein component (C) comprises at least one polyhydroxy aromatic compound.

52. The composition of claim 1 wherein component (C) comprises ethylene glycol.

53. The composition of claim 1 wherein component (C) comprises at least one primary or secondary hydroxyamine.

54. The composition of claim 1 wherein component (C) comprises (a) at least one N-(hydroxyl-substituted hydrocarbyl) primary or secondary amine, (b) at least one hydroxyl-substituted poly(hydrocarbyloxy) analog of (a), or (c) a mixture of (a) and (b).

55. The composition of claim 1 wherein component (C) comprises at least one primary or secondary alkanol amine containing up to about 40 carbon atoms.

56. The composition of claim 1 wherein component (C) is selected from the group consisting of (a) primary and secondary alkanol amines which can be represented correspondingly by the formulae

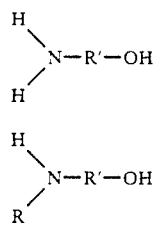

(b) hydroxyl-substituted oxyalkylene analogs of said alkanol amines represented by the formulae

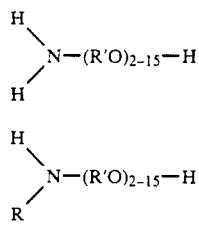

wherein R is a hydrocarbyl group of one to about 8 carbon atoms or a hydroxyl-substituted hydrocarbyl group of 2 to about 8 carbon atoms and R' is a divalent hydrocarbyl group of 2 to about 18 carbon atoms, and (c) mixtures of two of more thereof.

57. A composition comprising:
  (A) at least one salt moiety derived from (A)(I) at east one high molecular weight polycarboxylic acylating agent, said acylating agent (A)(I) having at least one hydrocarbyl substituent having an average of from about 50 to about 500 carbon atoms, and (A)(II) dimethylethanolamine;

(B) at least one salt moiety derived from (B)(I) at least one low molecular weight polycarboxylic acylating agent, said acylating agent (B)(I) having at least one hydrocarbyl substituent having an average of about 8 to about 18 carbon atoms, and (B)(II) dimethylethanolamine;

said moieties (A) and (B) being coupled together by (C) ethylene glycol.

58. A concentrate comprising from about 10% to about 90% by weight of the composition of claim 1, and a diluent.

59. A concentrate made by combining the composition of claim 1 with a diluent, said concentrate comprising from about 10% to about 90% by weight of said diluent.

* * * * *